(12) United States Patent
Nozue (10) Patent No.: US 9,449,540 B2
(45) Date of Patent: Sep. 20, 2016

(54) DISPLAY DEVICE

(71) Applicant: Japan Display Inc., Tokyo (JP)

(72) Inventor: Masahito Nozue, Tokyo (JE)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/109,100

(22) Filed: Dec. 17, 2013

(65) Prior Publication Data

US 2014/0202055 A1   Jul. 24, 2014

(30) Foreign Application Priority Data

Jan. 24, 2013  (JP) ................ 2013-011356

(51) Int. Cl.
*G09F 15/00* (2006.01)
*G02F 1/1335* (2006.01)

(52) U.S. Cl.
CPC ..... *G09F 15/0012* (2013.01); *G02F 1/133608* (2013.01); *G09F 15/0018* (2013.01)

(58) Field of Classification Search
CPC .............. G02B 6/0089; G02B 6/0088; G02F 1/133308; G02F 2001/133322; G02F 2201/50; G02F 2201/503; G02F 2201/46; G02F 2201/465; G06F 3/18
USPC .............................................. 40/781; 349/58
See application file for complete search history.

(56) References Cited

U.S. PATENT DOCUMENTS

| | | | | |
|---|---|---|---|---|
| 5,570,267 A * | 10/1996 | Ma | ............................ | 361/679.21 |
| 6,507,484 B2 * | 1/2003 | Fukuyoshi | ............... | 361/679.26 |
| 6,816,213 B2 * | 11/2004 | Kato et al. | ...................... | 349/58 |
| 6,976,781 B2 * | 12/2005 | Chu et al. | ...................... | 362/633 |
| 7,226,201 B1 * | 6/2007 | Li et al. | ........................ | 362/633 |
| 7,483,092 B2 * | 1/2009 | Morsch | ............................ | 349/58 |
| 7,503,685 B2 * | 3/2009 | Ura et al. | ...................... | 362/633 |
| 7,580,089 B2 * | 8/2009 | Ho et al. | ........................ | 349/58 |
| 7,961,457 B2 * | 6/2011 | Huang | ...................... | 361/679.21 |
| 8,228,459 B2 * | 7/2012 | Hong | ............................ | 349/58 |
| 2003/0067740 A1 * | 4/2003 | Kim et al. | ...................... | 361/681 |
| 2004/0196413 A1 * | 10/2004 | Satonaka | ....................... | 349/58 |
| 2005/0105011 A1 * | 5/2005 | An | .................................. | 349/58 |
| 2008/0137272 A1 | 6/2008 | Cheng et al. | | |
| 2012/0002129 A1 | 1/2012 | Azai | | |

(Continued)

FOREIGN PATENT DOCUMENTS

| | | |
|---|---|---|
| JP | 07-281183 | 10/1995 |
| JP | 09-114393 | 5/1997 |
| JP | 2010-175705 | 8/2010 |

(Continued)

OTHER PUBLICATIONS

Japanese Office Action issued Feb. 16, 2016, in corresponding Japanese Application No. 2013-011356.

*Primary Examiner* — Charles A Fox
*Assistant Examiner* — Christopher E Veraa
(74) *Attorney, Agent, or Firm* — K&L Gates LLP (57) ABSTRACT

An upper frame and a lower frame are prevented from coming close to each other within a predetermined distance by a push-in preventing pawl and an abutting part, while preventing the upper and lower frames from coming off by a come-off preventing pawl and an engagement part. In this manner, it becomes possible to prevent the load which causes deterioration of the display quality from being applied to a liquid crystal display panel, so that the reliability can be enhanced.

2 Claims, 10 Drawing Sheets

(56) References Cited

U.S. PATENT DOCUMENTS

2012/0092893 A1* 4/2012 Cho et al. .................. 362/633
2012/0236541 A1* 9/2012 Chen ........................ 362/97.2

FOREIGN PATENT DOCUMENTS

| JP | 2012-013759 | 1/2012 |
|----|-------------|--------|
| JP | 2012-014000 | 1/2012 |

* cited by examiner

DISPLAY DEVICE

CROSS REFERENCES TO RELATED APPLICATIONS

The present application claims priority to Japanese Priority Patent Application JP 2013-011356 filed in the Japan Patent Office on Jan. 24, 2013, the entire content of which is hereby incorporated by reference.

BACKGROUND

The present invention relates to a display device, and particularly relates to a display device in which a display panel is disposed between a pair of frames.

In a display device of various equipments such as a mobile phone, a portable information terminal, a digital camera and a multimedia player, a thin display device such as a liquid crystal display device and an organic electroluminescence (EL) display device has been adopted. In a thin display device like this, for example, a liquid crystal display device, a liquid crystal display panel and a lighting device which illuminates the liquid crystal display panel from a back side are disposed between a pair of metal frames, and thereby, strength of a module made up of the liquid crystal display panel and the lighting device is enhanced. A technique with respect to a display device in which a liquid crystal display panel and a lighting device are disposed between a pair of frames in this manner is described in Japanese Patent Application Laid-Open Publication No. 2012-013759 (Patent Document 1) and Japanese Patent Application Laid-Open Publication No. 07-281183 (Patent Document 2).

In a technique described in the Patent Document 1, a protruding part which protrudes toward a side surface of an upper frame is formed on a side surface of a lower frame, and an engagement part which engages with the protruding part of the lower frame is formed on the side surface of the upper frame. These protruding part and engagement part are brought into an engaged state by attaching the upper frame and lower frame to each other, and thereafter the engaged state is retained so that the upper and lower frames do not come off from each other. Inside the upper and lower frames, a liquid crystal display panel and a lighting module are disposed in a stacked manner, and the upper and lower frames sandwich the liquid crystal display panel and the lighting module from both sides in a stacking direction.

In addition, the Patent Document 2 describes an engagement structure between a lower case (corresponding to the lower frame) and a metal shield case (corresponding to the upper frame) similar to that of the Patent Document 1 mentioned above. Also, between the lower case and the metal shield case, a rubber cushion, an upper transparent glass substrate of the liquid crystal display panel and an adhesive double coated tape are sandwiched.

SUMMARY

Each of the engagement structures described in the Patent Documents 1 and 2 mentioned above prevents each frame from coming off from each other, and the engagement structure allows each frame to come close to each other within a predetermined distance. Therefore, when each frame is gripped strongly in a reliability assessment in the manufacture or by a user, each frame will come close to each other within a predetermined distance, and the grip force will be transmitted to the liquid crystal display panel. Consequently, in the technique described in the Patent Document 1, the grip force is directly transmitted to the liquid crystal display panel, which causes display quality deterioration such as the occurrence of display unevenness.

On the other hand, in the technique described in the Patent Document 2, the grip force is made to be transmitted only to the upper transparent glass substrate of the liquid crystal display panel via the rubber cushion so as to suppress the occurrence of the display unevenness. However, since the rubber cushion is prone to be transformed, when one side along a longitudinal direction of each frame is griped strongly or the like in a cantilever manner, for example, a load is applied to the whole liquid crystal display panel including the lower transparent glass substrate, so that the whole liquid crystal display panel is bent or the like and the occurrence of the display unevenness cannot be sufficiently prevented.

An object of the present invention is to prevent a pair of frames from coming close to each other within a predetermined distance while preventing the pair of frames from coming off from an attached state, thereby preventing the load which causes the deterioration of the display quality from being applied to a display panel.

In an aspect of the present invention, a display device includes: a display panel having a display surface and a frame surface located on a circumference of the display surface; a first frame provided so as to overlap the frame surface; a second frame attached to the first frame; a first wall part provided on an attaching part of the first frame to the second frame; a second wall part provided on an attaching part of the second frame to the first frame; a come-off preventing pawl which is provided on one of the wall parts and prevents the frames from coming off from a state in which the frames are attached; an engagement part which is provided on the other one of the wall parts, and with which the come-off preventing pawl is engaged; a push-in preventing pawl which is provided on one of the wall parts and prevents the frames from coming close to each other within a predetermined distance; and an abutting part which is provided on the other one of the wall parts, and on which the push-in preventing pawl abuts.

In another aspect of the present invention, the come-off preventing pawl and the engagement part and also the push-in preventing pawl and the abutting part are provided along circumferences of the respective frames, and the number of the push-in preventing pawls and abutting parts is larger than the number of the come-off preventing pawls and engagement parts.

In another aspect of the present invention, the display panel and the respective frames have a polygonal shape which has a plurality of sides and a plurality of corner parts, and the push-in preventing pawl and the abutting part are provided near at least one of the corner parts located on both end sides of the sides.

In another aspect of the present invention, the abutting part forms a bottom part of a cutout formed in the other one of the wall parts, and a bridging part which reinforces the opening while allowing movement of the push-in preventing pawl toward the abutting part when the frames are attached is provided at an opening of the cutout.

According to the present invention, it is possible to prevent each frame from coming close to each other within a predetermined distance by a push-in preventing pawl and an abutting part while preventing each frame from coming off by a come-off preventing pawl and an engagement part, so that it is possible to prevent the load which causes the deterioration of the display quality from being applied to a display panel and the reliability can be enhanced.

Additional features and advantages are described herein, and will be apparent from the following Detailed Description and the figures.

DETAILED DESCRIPTION

Hereinafter, an embodiment of the present invention will be described in detail with reference to drawings.

Figure 1:
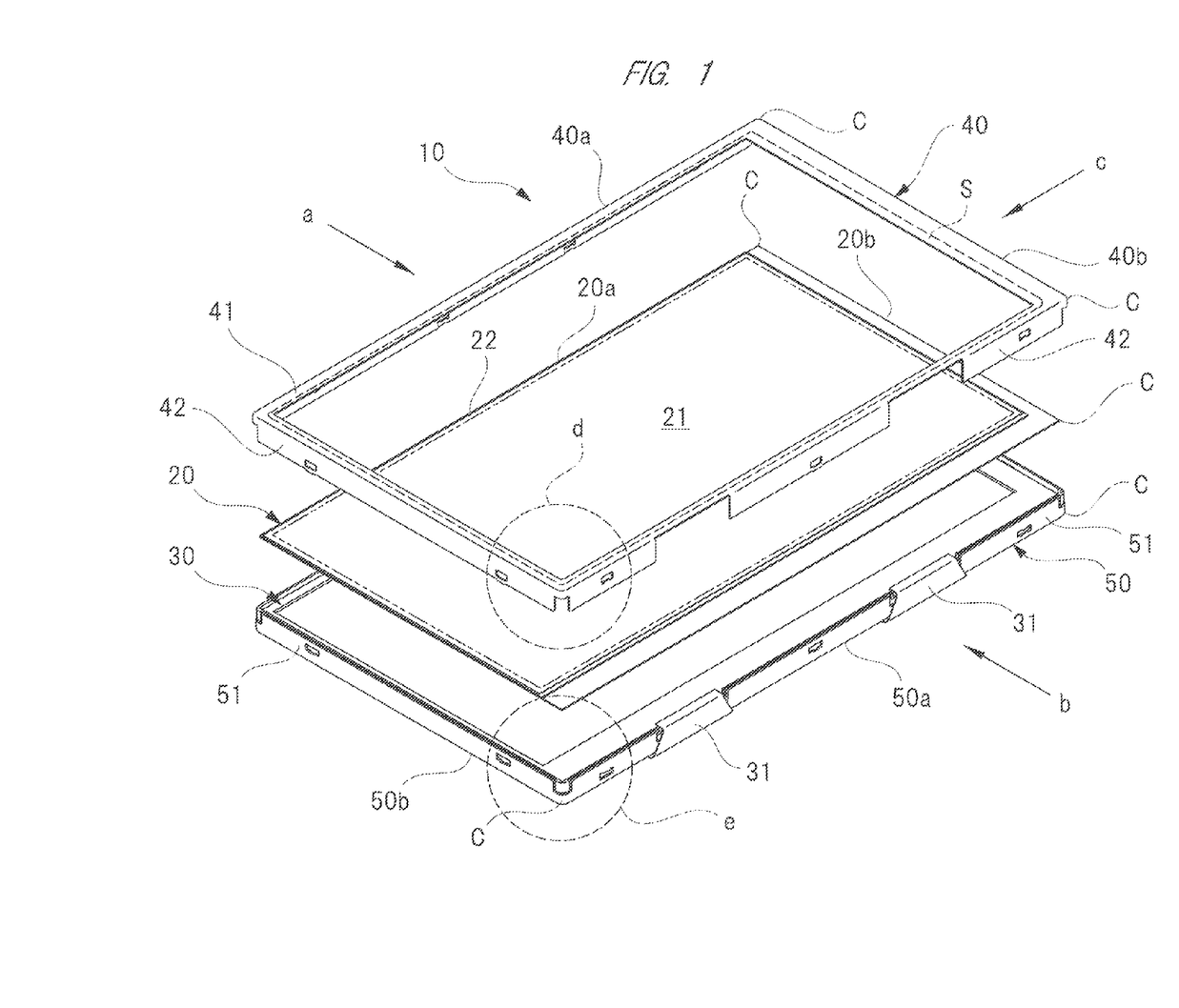
FIG. 1 is an exploded perspective view of a display device according to an embodiment of the present invention.

FIG. 1 is a perspective view showing an example of a display device, to which the present invention is applied, in an exploded manner. As shown in FIG. 1, a display device 10 is provided with a liquid crystal display panel 20 and a lighting device 30, and these liquid crystal display panel 20 and lighting device 30 are disposed between an upper frame 40 and a lower frame 50.

The liquid crystal display panel 20 as a display panel is formed into a polygonal shape or an approximately rectangular shape having a pair of long sides 20a, a pair of short sides 20b and four corner parts C. The liquid crystal display panel 20 has a display surface 21 and a frame surface 22 which is located on the circumference of the display surface 21 defined by a two-dot chain line serving as a boundary. Also, though not shown, the liquid crystal display panel 20 has first and second transparent glass substrates, a liquid crystal layer sandwiched between these transparent glass substrates, first and second polarizing filters disposed outside the first and second transparent glass substrates and the like, and is formed to be a plate-like shape by stacking them.

The lighting device 30 is disposed on a back surface side of the liquid crystal display panel 20, that is, on the lower frame 50 side, and is formed into an approximately rectangular shape similar to the liquid crystal display panel 20. The lighting device 30 illuminates the liquid crystal display panel 20 from the back surface side, and is made up of a light source lamp, an inverter circuit, a light guide plate and the like though not shown. To the lighting device 30, two flexible printed circuit boards 31 are connected, and these flexible printed circuit boards 31 are designed to supply a driving current to the lighting device 30 from a battery (not shown). Here, as the light source lamp, for example, a white LED is used. However, other than the white LED, a light emitter such as a cold cathode tube can be used as the light source lamp. In addition, the lighting device 30 is not limited to the type which illuminates the liquid crystal display panel 20 from the back surface side, and a sidelight or a front light may also be used.

The upper frame 40 as a first frame is formed into a polygonal shape or an approximately rectangular shape having a pair of long sides 40a, a pair of short sides 40b and four corner parts C by pressing a stainless steel plate. The upper frame 40 is provided with a frame body 41 through which the display surface 21 of the liquid crystal display panel 20 can be seen, and this frame body 41 is provided so as to overlap the frame surface 22 of the liquid crystal display panel 20.

A cushion sheet S made of an elastic material such as rubber is provided between the frame body 41 and the frame surface 22, and the cushion sheet S is attached to an inner side of the frame body 41. The cushion sheet S is provided so as to prevent the frame body 41 from being in direct contact with the frame surface 22 and damaging the frame surface 22, and prevent the liquid crystal display panel 20 and the lighting device 30 disposed between the upper and lower frames 40 and 50 from rattling.

On the circumference of the frame body 41, a first wall part 42 is formed integrally as a part bent at an approximately right angle. The first wall part 42 is provided so as to correspond to each of the pair of long sides 40a and the pair of short sides 40b, and each of the first wall parts 42 is designed to be attached to the outside of a second wall part 51 of the lower frame 50 (see FIGS. 6 and 7). More specifically, the first wall part 42 is provided at an attaching part of the upper frame 40 to the lower frame 50.

Figure 2A:
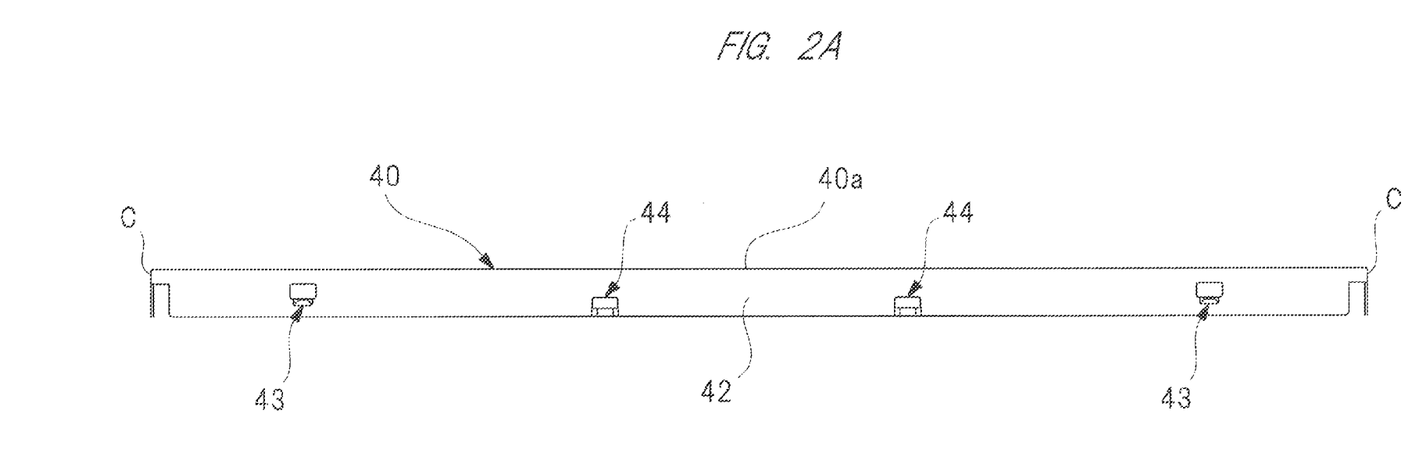
FIG. 2A is an arrow view of an upper frame viewed from a direction of an arrow a of FIG. 1.
Figure 2B:
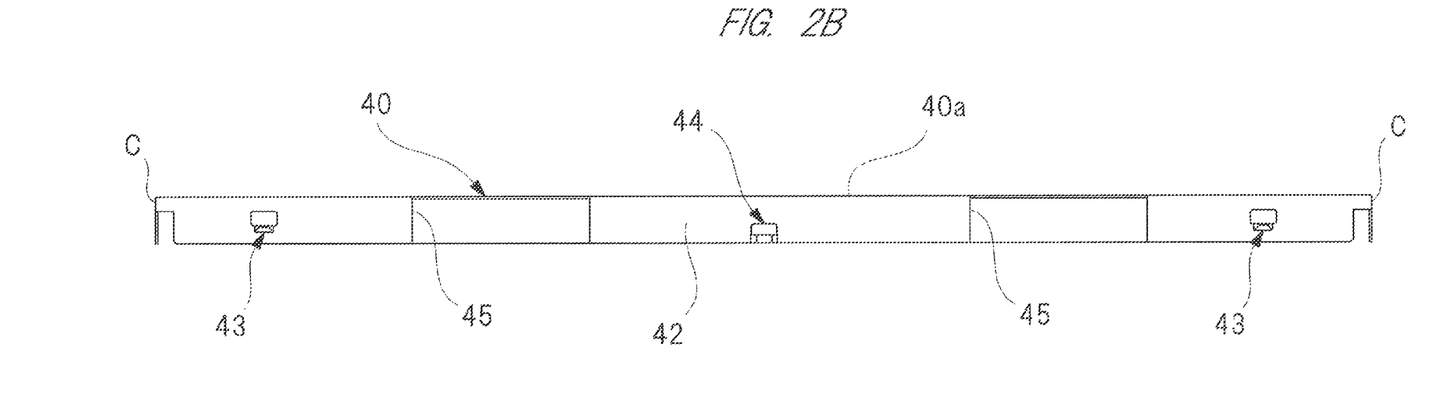
FIG. 2B is an arrow view of the upper frame viewed from a direction of an arrow b of FIG. 1.
Figure 3A:
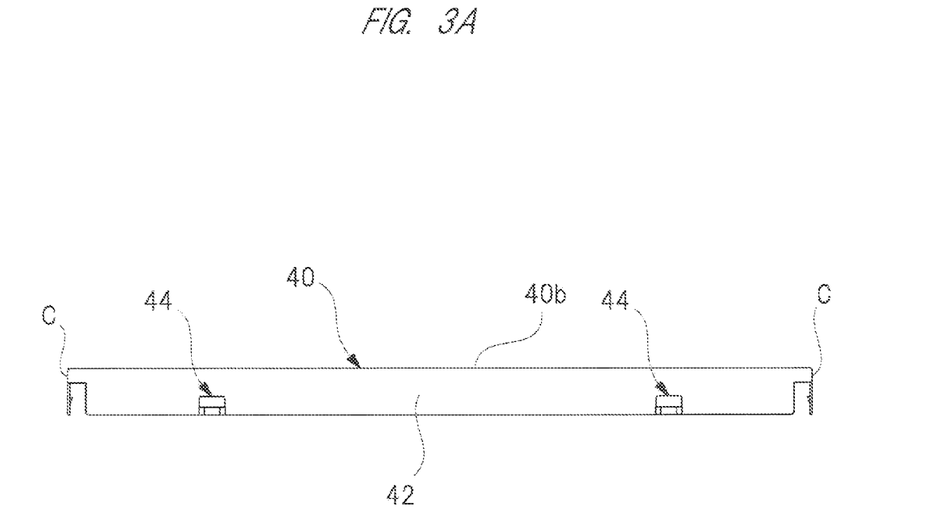
FIG. 3A is an arrow view of the upper frame viewed from a direction of an arrow c of FIG. 1.
Figure 3B:
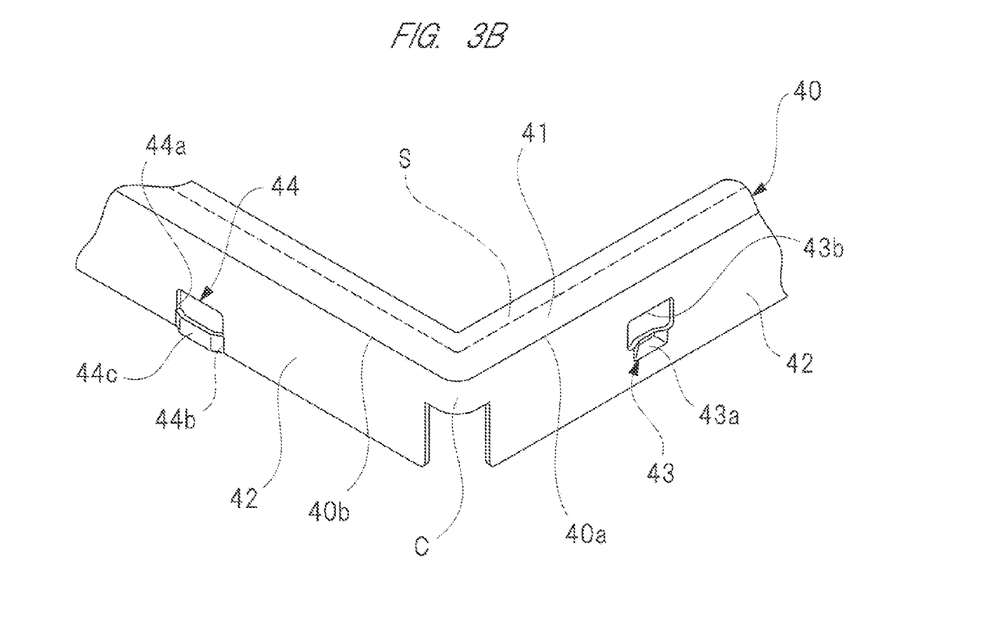
FIG. 3B is a partially enlarged view of a broken line circle d section of the upper frame in FIG. 1.

FIG. 2A is an arrow view of the upper frame viewed from a direction of an arrow a of FIG. 1, FIG. 2B is an arrow view of the upper frame viewed from a direction of an arrow b of FIG. 1, FIG. 3A is an arrow view of the upper frame viewed from a direction of an arrow c of FIG. 1, and FIG. 3B is a partially enlarged view of a broken line circle d section of the upper frame in FIG. 1.

As shown in FIG. 2A, in the first wall part 42 corresponding to one long side 40a, a pair of come-off preventing pawls 43 and a pair of abutting parts 44 are provided. The pair of come-off preventing pawls 43 is disposed at an approximate central part in a short-side direction of the first wall part 42 and on both end sides in a longitudinal direction of the first wall part 42. On the other hand, the pair of abutting parts 44 is disposed on an edge side (lower side in the figure) in the short-side direction of the first wall part 42 and between the come-off preventing pawls 43 in the longitudinal direction of the first wall part 42.

As shown in FIG. 2B, in the first wall part 42 corresponding to the other long side 40a, a pair of come-off preventing pawls 43 and one abutting part 44 are provided. The pair of come-off preventing pawls 43 is disposed at an approximate central part in a short-side direction of the first wall part 42 and on both end sides in a longitudinal direction of the first wall part 42. On the other hand, the one abutting part 44 is disposed on an edge side in the short-side direction of the first wall part 42 and between the come-off preventing pawls 43 in the longitudinal direction of the first wall part 42. In addition, between the come-off preventing pawls 43 and the abutting part 44, cutouts 45 for a first printed circuit board, which function as back clearance of the flexible printed circuit board 31 shown in FIG. 1, are provided.

The first wall parts 42 provided so as to correspond to the pair of short sides 40b are formed in approximately the same manner as shown in FIG. 3A. In the first wall part 42 corresponding to each of the short sides 40b, only a pair of abutting parts 44 is provided, and the come-off preventing pawl 43 as shown in FIG. 2 is not provided. Then, the pair of abutting parts 44 is disposed on an edge side in the short-side direction of the first wall part 42 and on both end sides in a longitudinal direction of the first wall part 42. More specifically, in the first wall part 42 corresponding to each short side 40b, each of the abutting parts 44 is provided near a pair of corner parts C located on both end sides in the longitudinal direction of the short side 40b.

As shown in FIG. 3B, the come-off preventing pawl 43 is formed so as to protrude toward the inside from the outside of the first wall part 42, that is, toward the second wall part 51 in the state where the first wall part 42 is attached to the second wall part 51 of the lower frame 50. On an edge side of the come-off preventing pawl 43 in the short-side direction of the first wall part 42, an inclined surface 43a is formed, and the inclined surface 43a is designed to climb over an engagement part 52 of the second wall part 51 when the first wall part 42 is attached to the second wall part 51. In this manner, the come-off preventing pawl 43 is engaged with the engagement part 52, which prevents the upper and lower frames 40 and 50 from coming off from each other from the state where the upper and lower frames 40 and 50 are attached. In other words, the come-off preventing pawl 43 constitutes a come-off preventing mechanism.

Also, an opening 43b is formed on a base end side (upper side in the figure) of the come-off preventing pawl 43 in the short-side direction of the first wall part 42, and the engagement part 52 is designed to enter into the opening 43b in the state where the first wall part 42 is attached to the second wall part 51.

As shown in FIG. 3B, the abutting part 44 forms a bottom part of a cutout 44a extending toward the edge side in the short-side direction of the first wall part 42, and a push-in preventing pawl 53 of the second wall part 51 is designed to abut on the abutting part 44 in the state where the first wall part 42 is attached to the second wall part 51. In this manner, the upper frame 40 and lower frame 50 are prevented from coming close to each other within a predetermined distance. In other words, the abutting part 44 forms a push-in preventing mechanism.

On an opening 44b side of the cutout 44a, that is, on an opposed part to the abutting part 44, a bridging part 44c is provided integrally. The bridging part 44c is formed so as to protrude toward the outside of the first wall part 42, that is, toward the opposite side of the second wall part 51 side in the state where the first wall part 42 is attached to the second wall part 51. In this manner, when the first wall part 42 is attached to the second wall part 51, the push-in preventing pawl 53 of the second wall part 51 enters into the cutout 44a, and movement toward the abutting part 44 is allowed. In addition, the bridging part 44c has a role to reinforce the opening 44b of the cutout 44a, which provides the sufficient strength to the first wall part 42.

As shown in FIG. 1, the lower frame 50 as the second frame is formed into a polygonal shape or an approximately rectangular shape having a pair of long sides 50a, a pair of short sides 50b and four corner parts C by pressing an aluminum plate. The lower frame 50 is provided with a bottom face part (not shown), and the lighting device 30 is disposed close to the bottom face part of the lower frame 50. Since the lower frame 50 is made of aluminum as described above, heat generated from the lighting device 30 can be readily dissipated to the outside.

On the circumference of the bottom face part of the lower frame 50, the second wall part 51 is formed integrally as a part bent at an approximately right angle. The second wall part 51 is provided so as to correspond to each of the pair of long sides 50a and the pair of short sides 50b, and each of the second wall parts 51 is designed to be attached to an inner side of the first wall part 42 of the upper frame 40 (see FIGS. 6 and 7). More specifically, the second wall part 51 is provided at an attaching part of the lower frame 50 to the upper frame 40.

Figure 4A:
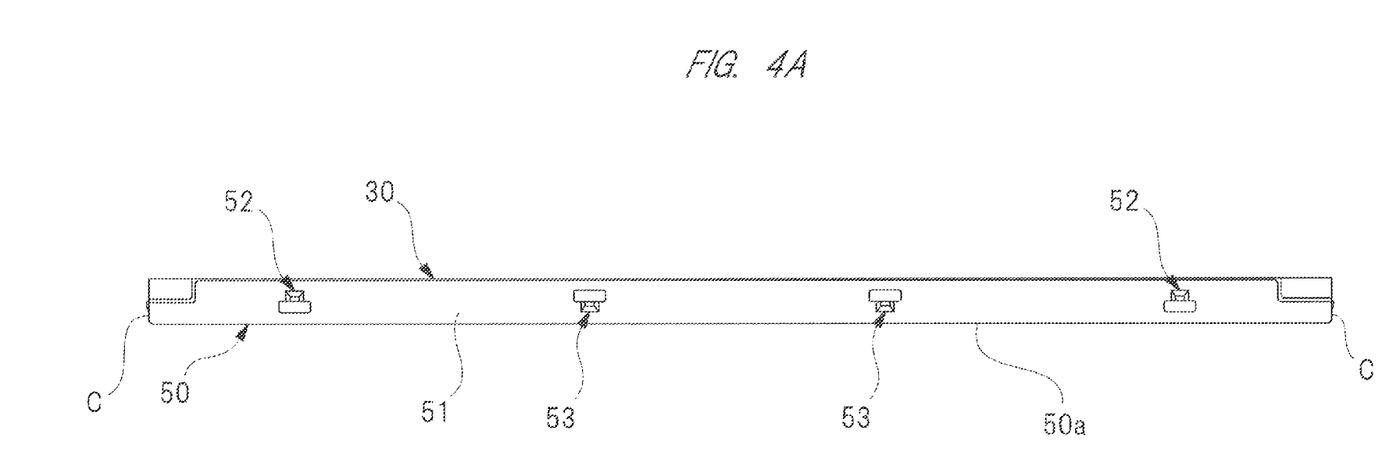
FIG. 4A is an arrow view of a lower frame viewed from the direction of the arrow a of FIG. 1.
Figure 4B:
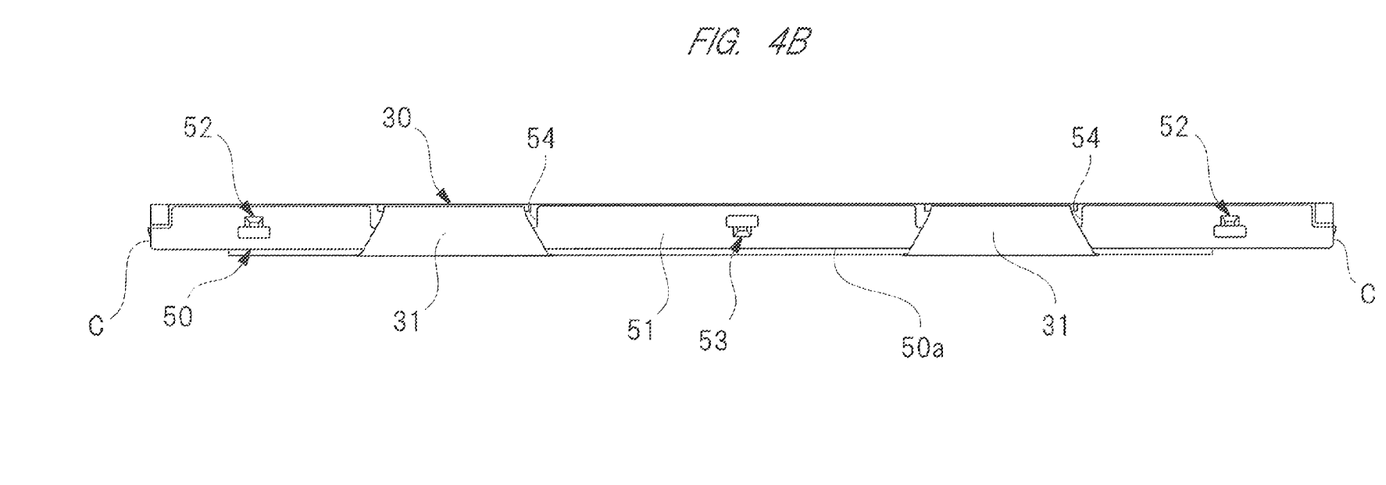
FIG. 4B is an arrow view of the lower frame viewed from the direction of the arrow b of FIG. 1.
Figure 5A:
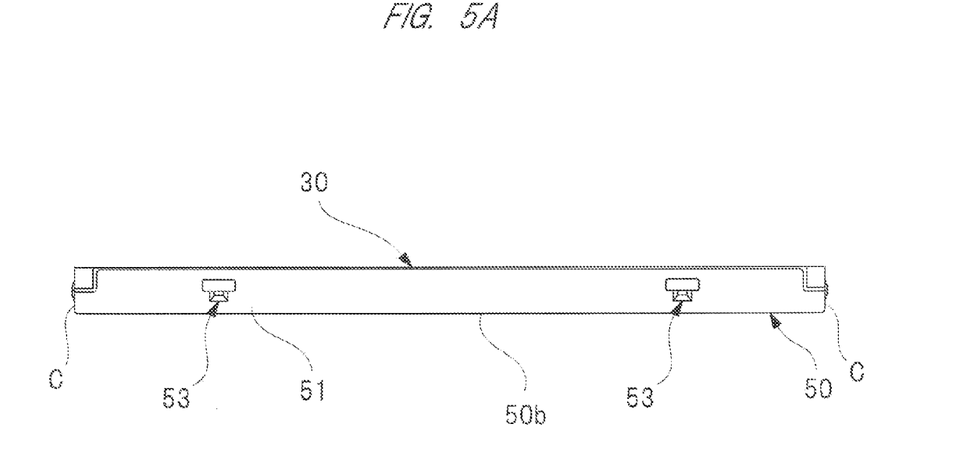
FIG. 5A is an arrow view of the lower frame viewed from the direction of the arrow c of FIG. 1.
Figure 5B:
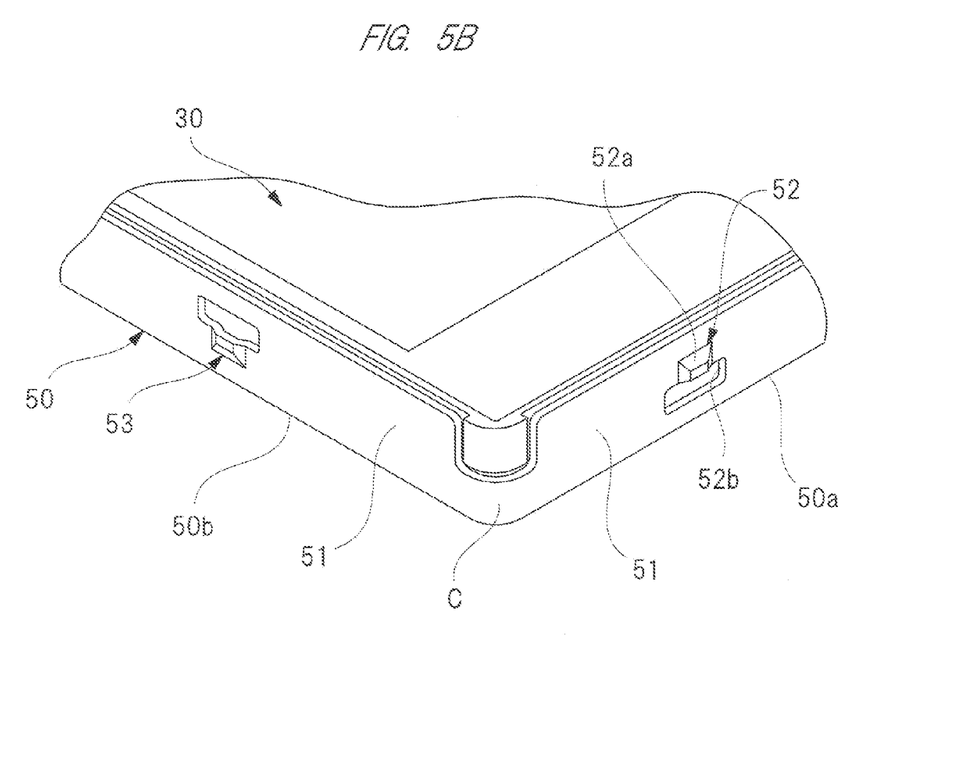
FIG. 5B is a partially enlarged view of a broken line circle e section of the lower frame in FIG. 1.

FIG. 4A is an arrow view of the lower frame viewed from the direction of the arrow a of FIG. 1, FIG. 4B is an arrow view of the lower frame viewed from the direction of the arrow b of FIG. 1, FIG. 5A is an arrow view of the lower frame viewed from the direction of the arrow c of FIG. 1, and FIG. 5B is a partially enlarged view of a broken line circle e section of the lower frame in FIG. 1. Note that FIGS. 4A and 4B and FIGS. 5A and 5B show the lower frame 50 in a state where the lighting device 30 has been housed.

As shown in FIG. 4A, in the second wall part 51 corresponding to one long side 50a, a pair of engagement parts 52 and a pair of push-in preventing pawls 53 are provided. The pair of engagement parts 52 is disposed at an approximate central part in a short-side direction of the second wall part 51 and on both end sides in a longitudinal direction of the second wall part 51. On the other hand, the pair of push-in preventing pawls 53 is disposed at an approximate central part in the short-side direction of the second wall part 51 and between the engagement parts 52 in the longitudinal direction of the second wall part 51.

As shown in FIG. 4B, in the second wall part 51 corresponding to the other long side 50a, a pair of engagement parts 52 and one push-in preventing pawl 53 are provided. The pair of engagement parts 52 is disposed at an approximate central part in a short-side direction of the second wall part 51 and on both end sides in a longitudinal direction of the second wall part 51. On the other hand, the one push-in preventing pawl 53 is disposed at an approximate central part in the short-side direction of the second wall part 51 and between the engagement parts 52 in the longitudinal direction of the second wall part 51. In addition, between the engagement parts 52 and the push-in preventing part 53, cutouts 54 for a second printed circuit board for introducing the flexible printed circuit board 31 from the outside of the lower frame 50 to the lighting device 30 are provided.

The second wall parts 51 provided so as to correspond to the pair of short sides 50b are formed in approximately the same manner as shown in FIG. 5A. In the second wall part 51 corresponding to each of the short sides 50b, only a pair of push-in preventing pawls 53 is provided, and the engagement part 52 as shown in FIG. 4 is not provided. Then, the pair of push-in preventing pawls 53 is disposed at an approximate central part in the short-side direction of the second wall part 51 and on both end sides in the longitudinal direction of the second wall part 51. More specifically, in the second wall part 51 corresponding to each short side 50b, each of the push-in preventing pawls 53 is provided near a pair of corner parts C located on both end sides in the longitudinal direction of the short side 50b.

As shown in FIG. 5B, the engagement part 52 is formed so as to protrude toward the outside from the inside of the second wall part 51, that is, toward the first wall part 42 in the state where the first wall part 42 of the upper frame 40 is attached to the second wall part 51. On an edge side of the engagement part 52 in the short-side direction of the second wall part 51 (upper side in the figure), an inclined surface 52a is formed, and the inclined surface 52a is designed so that the come-off preventing pawl 43 of the first wall part 42 climbs over it when the first wall part 42 is attached to the second wall part 51. In this manner, the engagement part 52 is engaged with the come-off preventing pawl 43, which prevents the upper and lower frames 40 and 50 from coming off from each other from the state where the upper and lower frames 40 and 50 are attached. In other words, the engagement part 52 constitutes the come-off preventing mechanism.

Also, an opening 52b is formed on a base end side (lower side in the figure) of the engagement part 52 in the short-side direction of the second wall part 51, and the come-off preventing pawl 43 is designed to enter into the opening 52b in the state where the first wall part 42 is attached to the second wall part 51.

As shown in FIG. 5B, the push-in preventing pawl 53 is formed so as to protrude toward the outside from the inside of the second wall part 51, that is, toward the first wall part 42 in the state where the first wall part 42 of the upper frame 40 is attached to the second wall part 51. A protrusion height of the push-in preventing pawl 53 is set to a height dimension capable of passing through the inside of the bridging part 44c provided in the first wall part 42. In this manner, the push-in preventing pawl 53 is guided smoothly into the cutout 44a of the first wall part 42, and then abuts on the abutting part 44 which forms a bottom part of the cutout 44a.

As described above, the push-in preventing pawl 53 is designed to prevent the upper and lower frames 40 and 50 from coming close to each other within a predetermined distance, and forms the push-in preventing mechanism.

As mentioned above, a set made up of the come-off preventing pawl 43 of the upper frame 40 and the engagement part 52 of the lower frame 50 forms the come-off preventing mechanism, and a set made up of the abutting part 44 of the upper frame 40 and the push-in preventing pawl 53 of the lower frame 50 constitutes the push-in preventing mechanism. As shown in FIGS. 2 to 5, on the circumference of the upper and lower frames 40 and 50, four come-off preventing mechanisms are provided, and seven push-in preventing mechanisms are provided. More specifically, the number of the push-in preventing mechanisms is larger than the number of the come-off preventing mechanisms.

The come-off preventing mechanism is disposed close to the corner part C of the upper and lower frames 40 and 50, and an optimal number of the come-off preventing mechanisms capable of preventing the corner part C of the upper frame 40 from coming off in such a manner as partially floating from the corner part C of the lower frame 50 and preventing the upper frame 40 from coming off from the lower frame 50 by its own weight are provided. On the other hand, the push-in preventing mechanism is disposed not only close to the corner part C of the upper and lower frames 40 and 50, but also near the central part of each of the long sides 40a and 50a of the upper and lower frames 40 and 50.

Since the push-in preventing mechanisms are separately disposed on the circumference of the upper and lower frames 40 and 50 as described above, even when a user grips any part of the upper and lower frames 40 and 50 including the corner parts C of the upper and lower frames 40 and 50, it is possible to effectively prevent the upper and lower frames 40 and 50 from coming close to each other within a predetermined distance.

Next, an attaching procedure of the upper frame 40 and the lower frame 50 formed as mentioned above will be described in detail, while dividing the description into a part of the come-off preventing mechanism and a part of the push-in preventing mechanism. Note that, after the come-off preventing pawl 43 and the engagement part 52 are engaged with each other, the abutting part 44 and the push-in preventing pawl 53 are engaged with each other at approximately the same time.

Figure 6A:
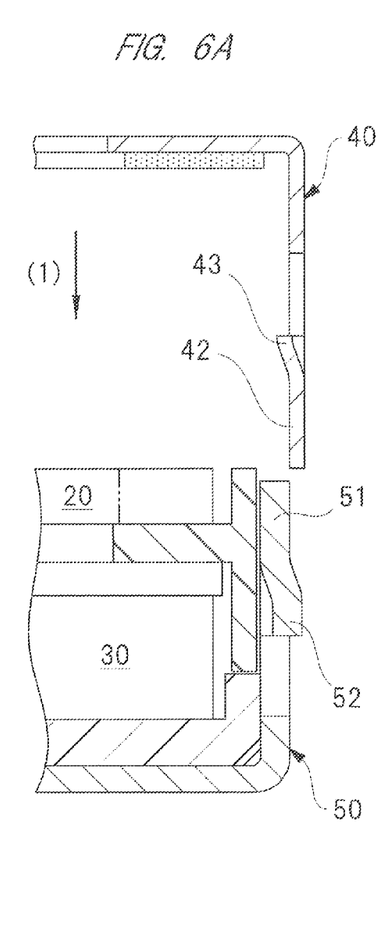
FIG. 6A is a partially enlarged sectional view illustrating an engagement operation of a come-off preventing mechanism.
Figure 6B:
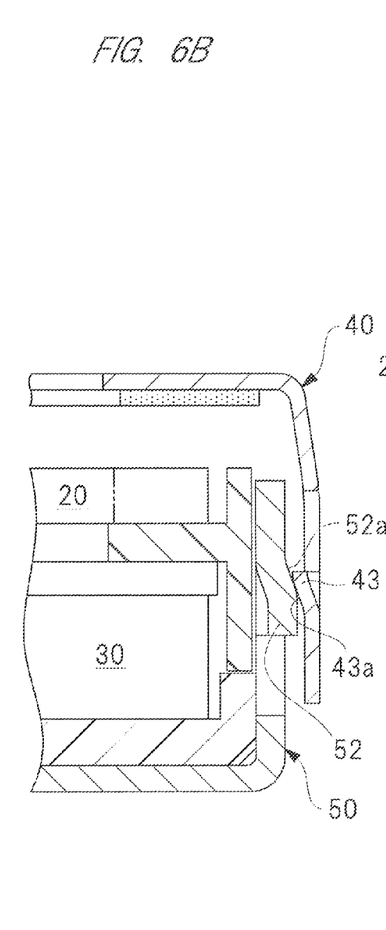
FIG. 6B is a partially enlarged sectional view illustrating the engagement operation of the come-off preventing mechanism.
Figure 6C:
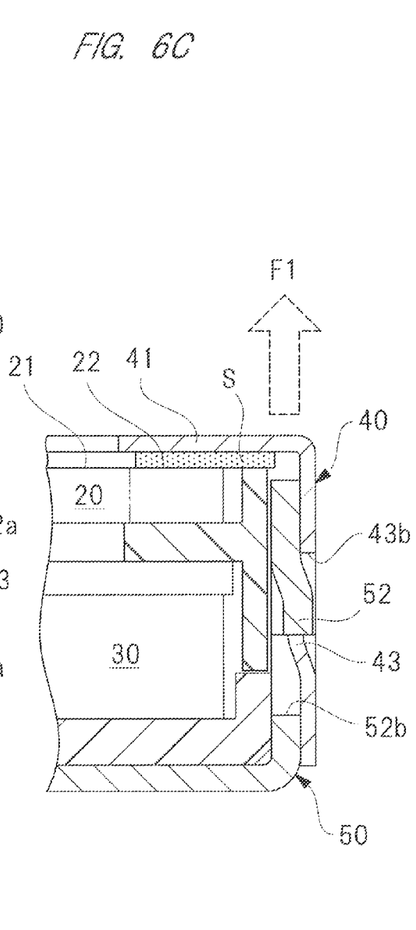
FIG. 6C is a partially enlarged sectional view illustrating the engagement operation of the come-off preventing mechanism.
Figure 7A:
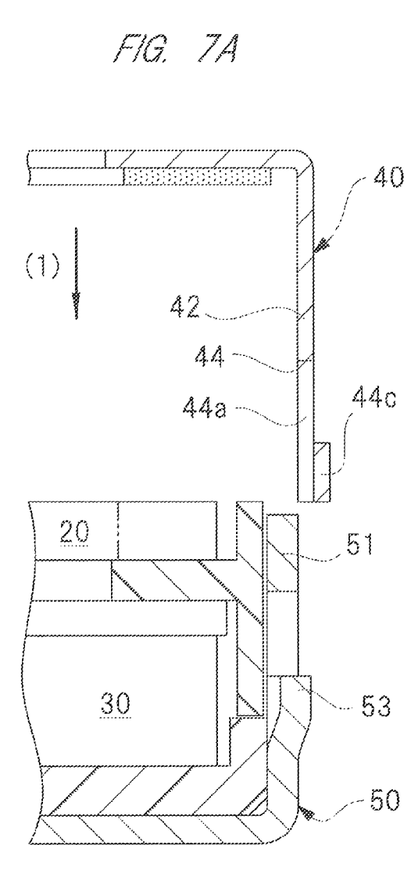
FIG. 7A is a partially enlarged sectional view illustrating an abutment operation of a push-in preventing mechanism.
Figure 7B:
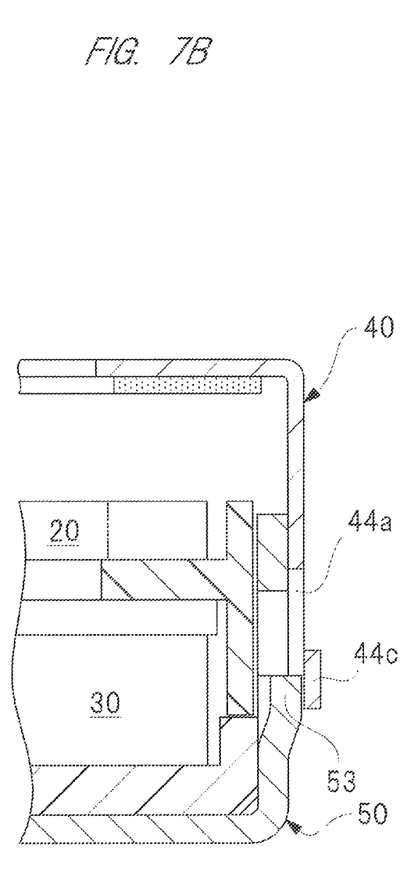
FIG. 7B is a partially enlarged sectional view illustrating the abutment operation of the push-in preventing mechanism.
Figure 7C:
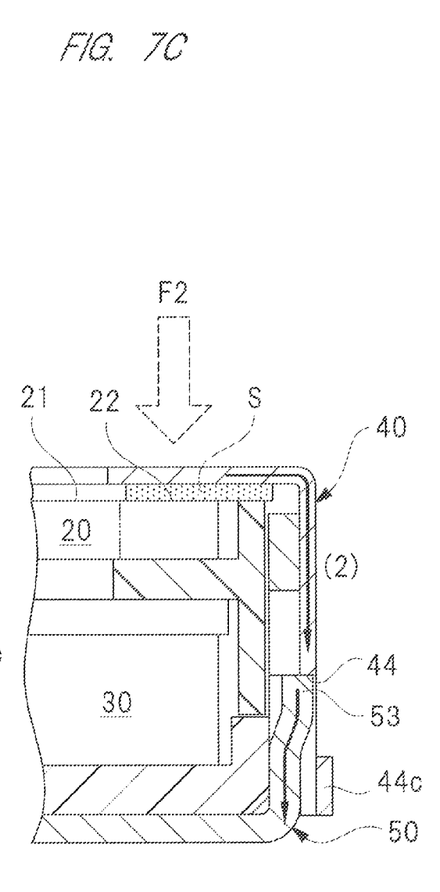
FIG. 7C is a partially enlarged sectional view illustrating the abutment operation of the push-in preventing mechanism.
Figure 8:
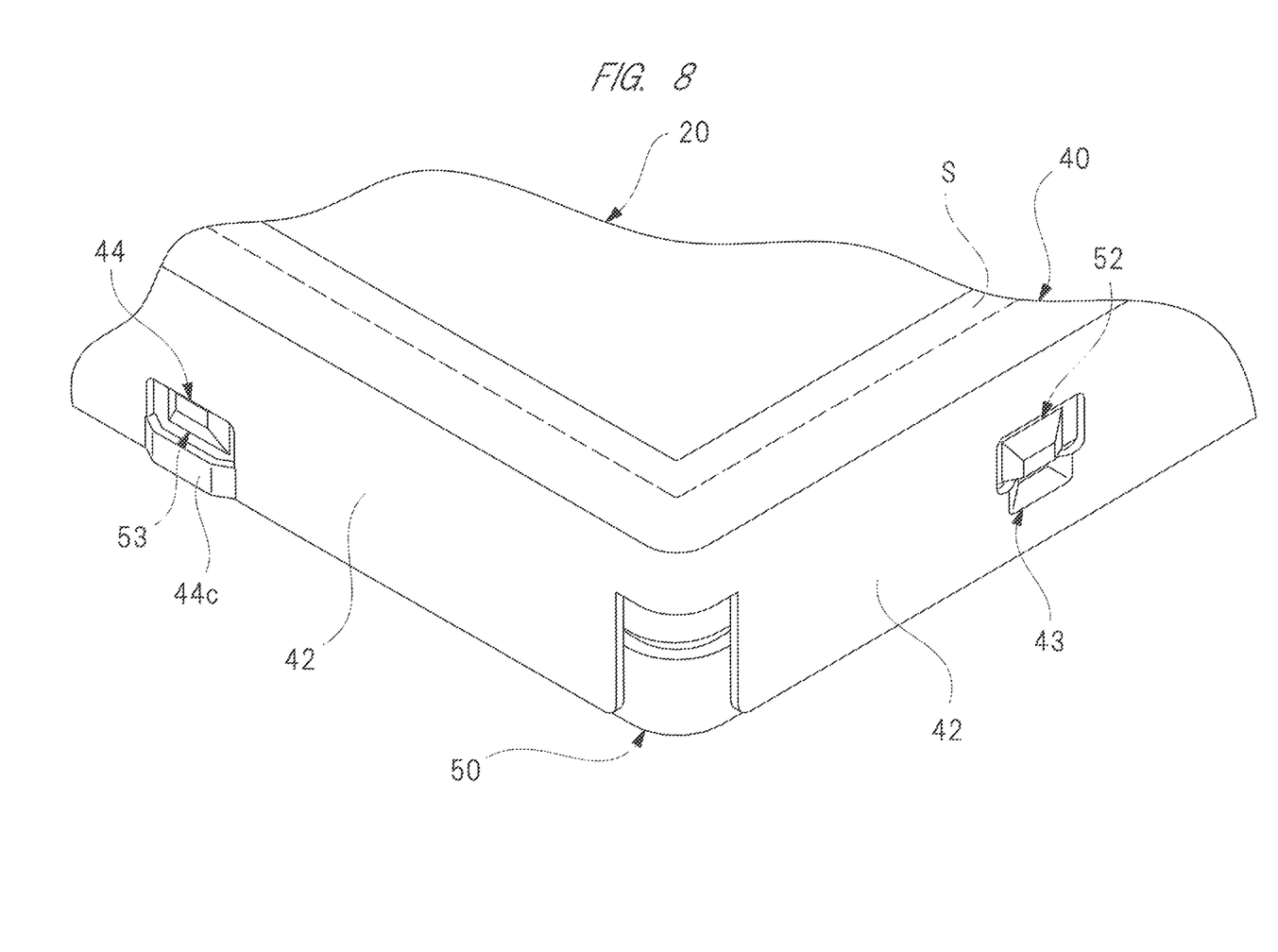
FIG. 8 is a perspective view showing an engaged state of the come-off preventing mechanism and an abutting state of the push-in preventing mechanism.

FIGS. 6A to 6C are partially enlarged sectional views illustrating an engagement operation of the come-off preventing mechanism, FIGS. 7A to 7C are partially enlarged sectional views illustrating an abutment operation of the push-in preventing mechanism, and FIG. 8 is a perspective view showing an engaged state of the come-off preventing mechanism and an abutting state of the push-in preventing mechanism.

[Come-Off Preventing Mechanism]

As shown in FIG. 6A, first, the lighting device 30, the liquid crystal display panel 20 and others are housed in this order in the lower frame 50, and the upper frame 40 is placed above the lower frame 50. Thereafter, the upper frame 40 is moved toward the lower frame 50 as indicated by an arrow (1) in the figure.

Then, the first wall part 42 of the upper frame 40 is gradually fitted to the outside of the second wall part 51 of the lower frame 50. By continuing the movement of the upper frame 40 toward the lower frame 50, the come-off preventing pawl 43 of the first wall part 42 starts to climb the engagement part 52 of the second wall part 51 as shown in FIG. 6B. At this time, the respective inclined surfaces 43a and 52a are designed to make a sliding contact with each other so as to guide the come-off preventing pawl 43.

Thereafter, by further moving the upper frame 40 toward the lower frame 50, as shown in FIG. 6C, the come-off preventing pawl 43 climbs over the engagement part 52 completely, and the come-off preventing pawl 43 and the engagement part 52 enter into the opening 52b and the opening 43b, respectively. In this manner, as shown in FIG. 8, the engagement operation between the come-off preventing pawl 43 and the engagement part 52 is completed, and the come-off preventing pawl 43 and the engagement part 52 are in the mutually engaged state.

After the come-off preventing mechanism is once in the engaged state in this manner, even when a force F1 is applied in a direction of a dashed outline arrow in FIG. 6, that is, in a direction in which the upper frame 40 and the lower frame 50 come off, the upper frame 40 and the lower frame 50 do not come off. Note that the cushion sheet S pasted inside the frame body 41 makes a contact with the frame surface 22 of the liquid crystal display panel 20 with a little elastic deformation as shown in the figure, but the elastic force of the cushion sheet S does not cause the display unevenness on the liquid crystal display panel 20.

[Push-in Preventing Mechanism]

As indicated by an arrow (1) of FIG. 7A, from the state where the upper frame 40 is placed above the lower frame 50, the upper frame 40 is moved toward the lower frame 50. Then, the first wall part 42 of the upper frame 40 is gradually fitted to the outside of the second wall part 51 of the lower frame 50.

By continuing the movement of the upper frame 40 toward the lower frame 50, the push-in preventing pawl 53 of the second wall part 51 enters into the cutout 44a of the first wall part 42 as shown in FIG. 7B. At this time, the push-in preventing pawl 53 passes through the inside of the bridging part 44c without making contact with the bridging part 44c.

Thereafter, by further moving the upper frame 40 toward the lower frame 50, as shown in FIG. 7C, the push-in preventing pawl 53 abuts on the abutting part 44, and the upper frame 40 is prevented from coming closer to the lower frame 50 from there. In this manner, as shown in FIG. 8, the push-in preventing pawl 53 and the abutting part 44 abut on each other and the push-in preventing pawl 53 and the abutting part 44 are in the abutting state.

After the push-in preventing mechanism is once in the abutting state, even when a force F2 is applied in a direction of a dashed outline arrow in FIG. 7, that is, in a direction in which the upper frame 40 and the lower frame 50 come close to each other within a predetermined distance, this force F2 (that is, grip force or the like) is transmitted from the upper frame 40 to the lower frame 50 via the abutting part 44 and the push-in preventing pawl 53 as indicated by an arrow (2) in the figure. Therefore, the force F2 such as the grip force is not transmitted to the frame surface 22 of the liquid crystal display panel 20, and the display unevenness does not occur in the liquid crystal display panel 20.

As described in detail above, in the display device 10 of the present embodiment, it is possible to prevent the upper and lower frames 40 and 50 from coming close to each other within a predetermined distance by the push-in preventing pawl 53 and the abutting part 44, while preventing the upper and lower frames 40 and 50 from coming off by the come-off preventing pawl 43 and the engagement part 52, so that it is possible to prevent the load which causes the deterioration of the display quality from being applied to the liquid crystal display panel 20 and the reliability can be enhanced.

In addition, in the display device 10 of the present embodiment, seven push-in preventing mechanisms and four come-off preventing mechanisms are provided, and the number of push-in preventing mechanisms is made larger than the number of come-off preventing mechanisms. Therefore, even when a user grips any part, which is easy to grip, of the upper and lower frames 40 and 50 including the corner part C, it is possible to prevent the display unevenness from occurring on the liquid crystal display panel 20.

Here, the come-off preventing mechanism and the push-in preventing mechanism may have structures as shown in FIGS. 9A and 9B and FIGS. 10A and 10B. Hereinafter, modification examples of the come-off preventing mechanism and the push-in preventing mechanism will be described in detail with reference to these drawings. Note that the same symbol is given to a part which has the same function as the embodiment mentioned above, and the detailed description thereof will be omitted.

Figure 9A:
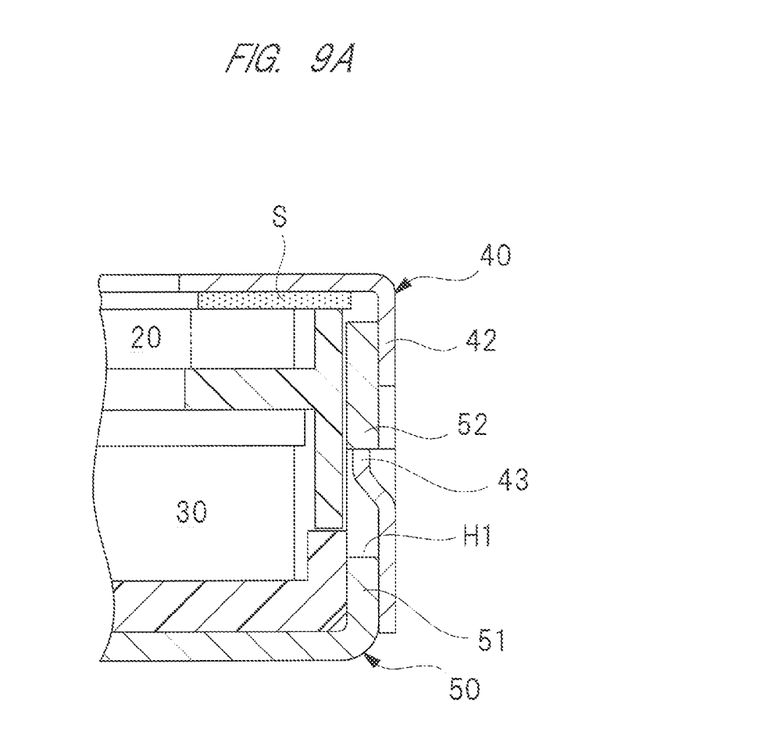
FIG. 9A is a partially enlarged sectional view showing a first modification example of the come-off preventing mechanism.
Figure 9B:
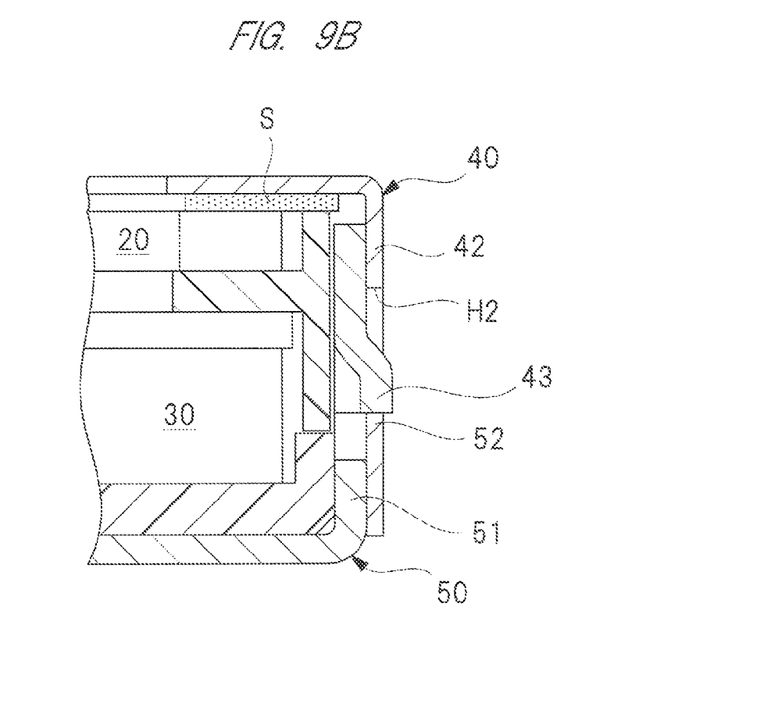
FIG. 9B is a partially enlarged sectional view showing a second modification example of the come-off preventing mechanism.
Figure 10A:
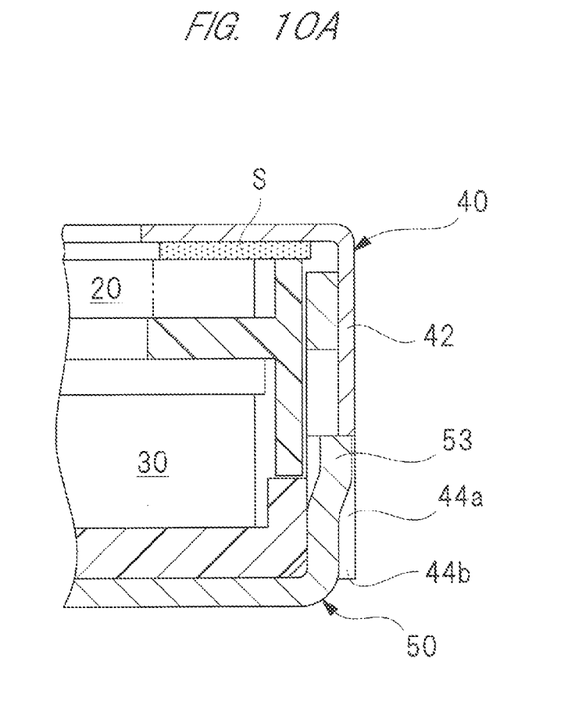
FIG. 10A is a partially enlarged sectional view showing a first modification example of the push-in preventing mechanism.
Figure 10B:
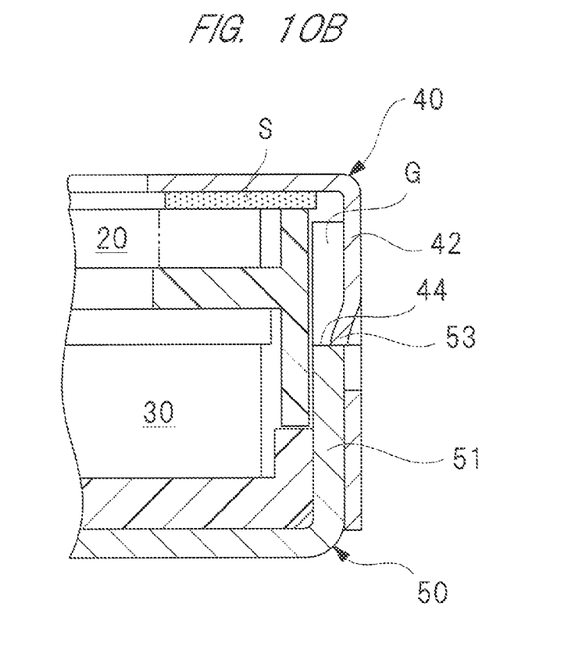
FIG. 10B is a partially enlarged sectional view showing a second modification example of the push-in preventing mechanism.

FIGS. 9A and 9B are partially enlarged sectional views each showing a first modification example and a second modification example of the come-off preventing mechanism, and FIGS. 10A and 10B are partially enlarged sectional views each showing a first modification example and a second modification example of the push-in preventing mechanism.

In the first modification example of the come-off preventing mechanism shown in FIG. 9A, as compared with the embodiment mentioned above, the engagement part 52 is formed as a simple through-hole H1 formed in the second wall part 51 without protruding toward the outside from the inside of the second wall part 51. In addition, the protruding amount toward the inside of the come-off preventing pawl 43 is increased, thereby providing sufficient engagement strength between the engagement part 52 and the come-off preventing pawl 43.

In the second modification example of the come-off preventing mechanism shown in FIG. 9B, the engagement part 52 is formed in the first wall part 42 by forming a through-hole H2 in the first wall part 42. On the other hand, the come-off preventing pawl 43 is formed in the second wall part 51 so as to protrude toward the outside from the inside of the second wall part 51. In other words, in the second modification example, an engagement relationship is reversed as compared with the embodiment mentioned above.

The first modification example of the push-in preventing mechanism shown in FIG. 10A is different from the embodiment mentioned above in that the bridging part 44c (see FIG. 3) provided on the opening 44b side of the cutout 44a is omitted.

In the second modification example of the push-in preventing mechanism shown in FIG. 10B, the push-in preventing pawl 53 is formed in the first wall part 42 so as to protrude toward the inside from the outside of the first wall part 42. On the other hand, a cutout G is provided on an edge side (upper side in the figure) in the short-side direction of the second wall part 51, and the abutting part 44 is formed by the bottom part of the cutout G. In other words, in the second modification example, the engagement relationship is reversed as compared with the embodiment mentioned above.

The present invention is not limited to the foregoing embodiments and various modifications and alterations can be made within the scope of the present invention. For example, in the above-mentioned embodiments, the case where the liquid crystal display panel 20 is adopted as the display panel disposed between the upper frame 40 and the lower frame 50 has been described, but the present invention is not limited to this, and can also be applied to the case in which a display panel of other forms such as an organic EL display panel or an inorganic EL display panel is adopted. When the organic EL display panel or the inorganic EL display panel is used, the lighting device can be omitted.

Furthermore, in the above-mentioned embodiment, the display device 10 provided with the liquid crystal display panel 20 having the approximately rectangular shape and the upper and lower frames 40 and 50 having the approximately rectangular shape has been shown, but the present invention is not limited to this, and can also be applied to a display device provided with a liquid crystal display panel and upper and lower frames, which have a circular shape or a polygonal shape such as a pentagonal shape.

Also, in the above-mentioned embodiment, the case where four come-off preventing mechanisms and seven push-in preventing mechanisms are provided on the circumference of the upper frame 40 and lower frame 50 has been shown, but the present invention is not limited to this, and it is possible to arbitrarily set the numbers of the come-off preventing mechanisms and the push-in preventing mechanisms. For example, when the present invention is applied to a larger display device, the numbers of the come-off preventing mechanisms and push-in preventing mechanisms may be doubled. In addition, the number of the come-off preventing mechanisms may be made larger than the number of the push-in preventing mechanisms depending on the specifications needed for the display device.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device, comprising:
    a display panel having a display surface and a frame surface located on a circumference of the display surface;
    a first frame provided so as to overlap the frame surface;
    a second frame attached to the first frame;
    a first wall part provided on the first frame and serving as an attaching part to the second frame;
    a second wall part provided on the second frame to be opposed to the first wall part and serving as an attaching part to the first frame;
    an opening which is provided in one of the wall parts and penetrates in a direction in which the wall parts are opposed and into which an engagement part provided in the other of the wall parts enters, and a come-off preventing pawl which protrudes toward the other of the wall parts and engages with the engagement part to prevent the frames from coming off;
    an opening which is provided in the other of the wall parts and penetrates, in the direction in which the wall parts are opposed and into which the come-off preventing pawl enters, and the engagement part which protrudes toward the one of the wall parts and with which the come-off preventing pawl is engaged;
    a push-in preventing pawl which is provided on the wall part disposed on an inner side in a state where the wall parts are attached to each other and prevents the frames from coming close to each other within a predetermined distance; and
    a cutout which is provided on the wall part disposed on an outer side in the state where the wall parts are attached to each other and into which the push-in preventing pawl enters, an abutting part which forms a bottom part of the cutout and on which the push-in preventing pawl abuts, and a bridging part which reinforces an opening formed on an opposite side of the bottom part of the cutout in an attaching direction of the frames and through which the push-in preventing pawl passes,
    wherein the push-in preventing pawl provided in the wall part on the inner side protrudes toward the wall part disposed on the outer side, and
    the bridging part provided in the wall part on the outer side protrudes toward an opposite side of the wall part disposed on the inner side.

2. The display device according to claim 1, wherein the come-off preventing pawl and the engagement part and also the push-in preventing pawl and the abutting part are plural in number and are provided along circumferences of the respective frames, and the number of the push-in preventing pawls and abutting parts is larger than the number of the come-off preventing pawls and engagement parts.

* * * * *